July 21, 1970   G. VAN AVERMAETE   3,521,533
ROTARY MACHINE, SUCH AS A ROTARY INTERNAL COMBUSTION
ENGINE, TURBINE, COMPRESSOR, AND THE LIKE
Filed Nov. 16, 1967   4 Sheets-Sheet 1
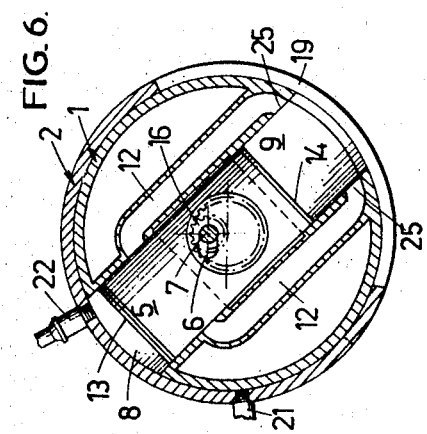
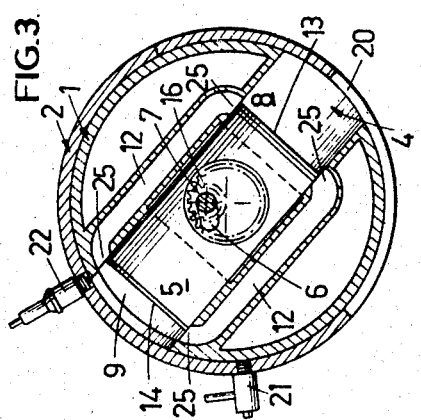
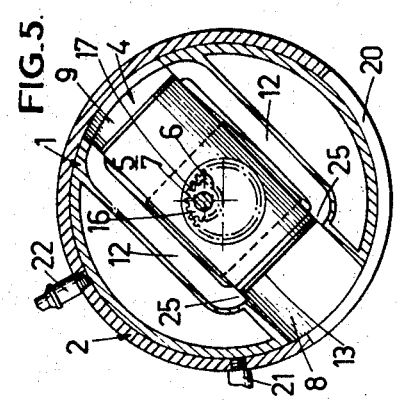
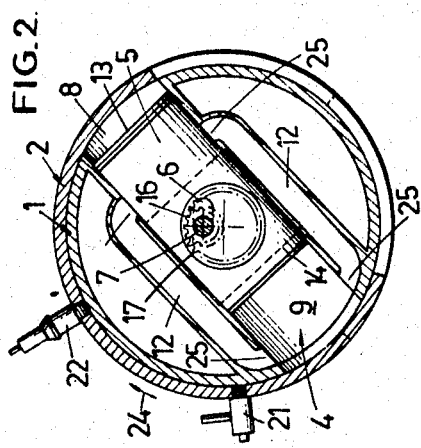
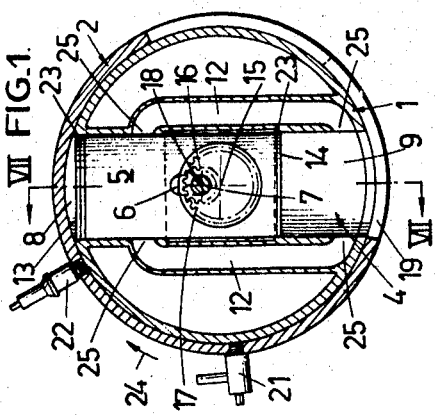
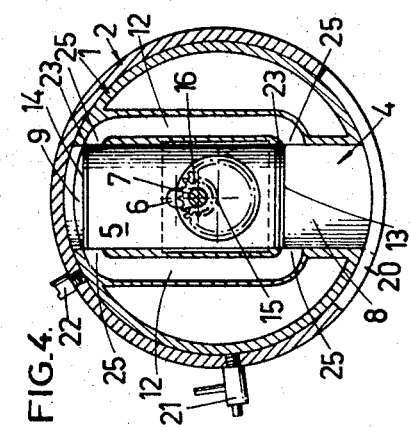
INVENTORS
Gilbert Van Avermaete
By Cushman, Darby & Cushman
Attorneys July 21, 1970 G. VAN AVERMAETE 3,521,533
ROTARY MACHINE, SUCH AS A ROTARY INTERNAL COMBUSTION
ENGINE, TURBINE, COMPRESSOR, AND THE LIKE
Filed Nov. 16, 1967 4 Sheets-Sheet 2
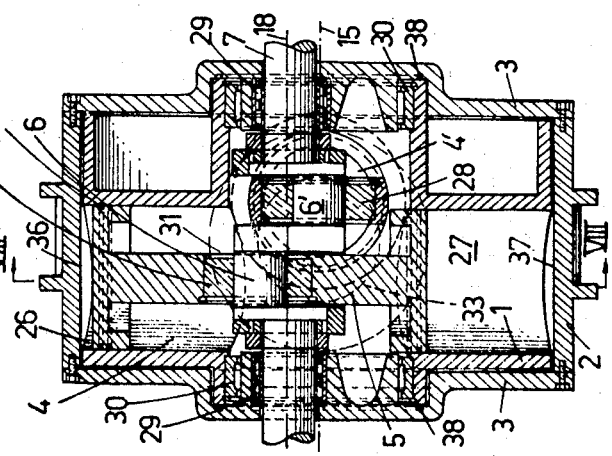
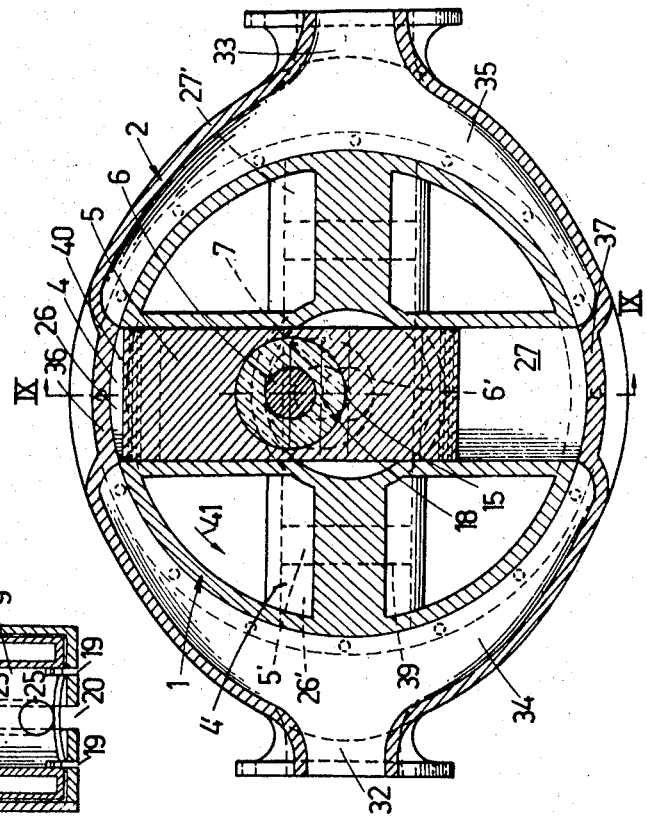
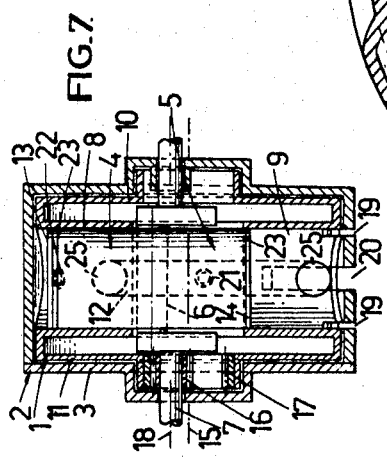
INVENTORS
Gilbert Van Avermaete
By Cushman, Darby & Cushman
Attorneys July 21, 1970  G. VAN AVERMAETE  3,521,533
ROTARY MACHINE, SUCH AS A ROTARY INTERNAL COMBUSTION
ENGINE, TURBINE, COMPRESSOR, AND THE LIKE
Filed Nov. 16, 1967  4 Sheets-Sheet 3

INVENTORS
Gilbert Van Avermaete

By Cushman, Darby & Cushman
Attorneys

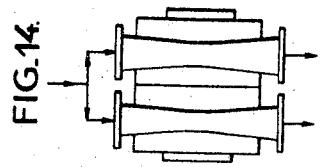
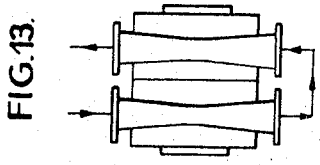
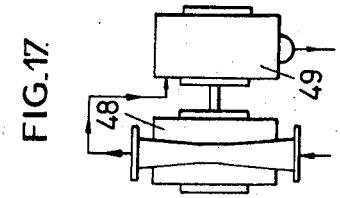
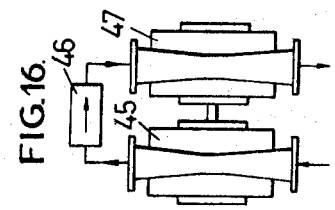
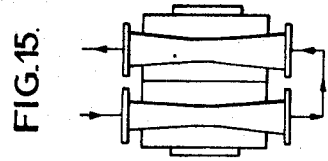
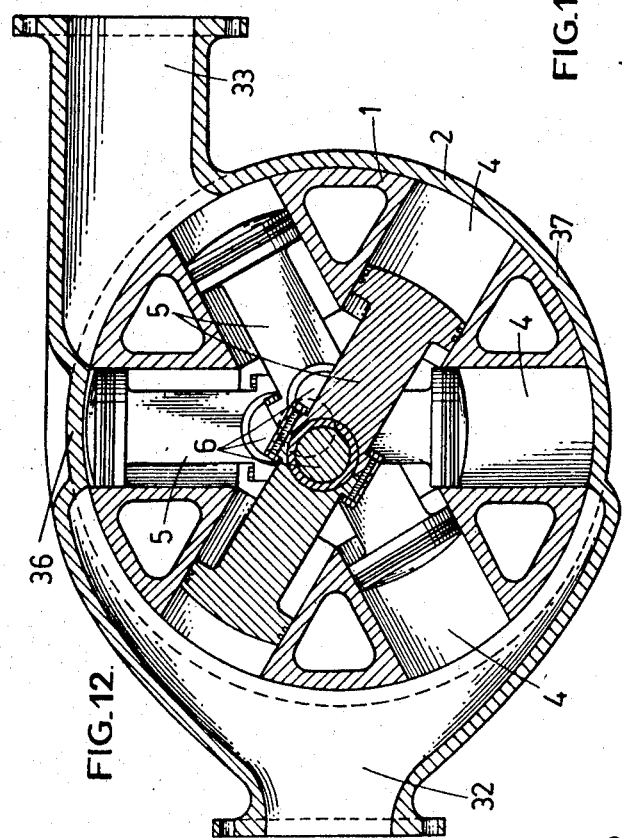
INVENTORS
Gilbert Van Avemoete United States Patent Office 3,521,533
Patented July 21, 1970

3,521,533
ROTARY MACHINE, SUCH AS A ROTARY INTERNAL COMBUSTION ENGINE, TURBINE, COMPRESSOR, AND THE LIKE
Gilbert Van Avermaete, 20 Avenue Nothomb, Arlon, Belgium
Filed Nov. 16, 1967, Ser. No. 683,674
Claims priority, application Luxemburg, Nov. 25, 1966, 52,437; Feb. 10, 1967, 52,973; June 2, 1967, 53,810; Nov. 10, 1967, 54,838
Int. Cl. F01b *13/06;* F02b *57/06;* F04b *27/06*
U.S. Cl. 91—496                                                    6 Claims

ABSTRACT OF THE DISCLOSURE

This invention concerns a rotary machine such as a motor, a turbine, a pump, a compressor and the like, comprising at least one rotor rotating inside a stator coaxial therewith, provided with at least one cylindrical chamber, a piston being fitted in this chamber and mounted on the crank-pin of a crank-shaft carried by the stator, the crank-pin and the crank-shaft being offset with reference to the axis of rotation of the rotor, so as to impel the piston with a reciprocating motion inside the chamber during the rotation of the rotor.

---

The present invention has for its object a rotary machine, such as a motor, a turbine, a pump, a compressor and the like, comprising at least one rotor rotating inside a stator coaxially therewith.

The known rotary machines and in particular the internal combustion engines are, in the majority of cases, of complicated construction and of low strength. Moreover, the sealing of the combustion chambers is not effected in a satisfactory manner, this inadequate sealing reducing considerably the efficiency of such engines.

The object of the invention is to overcome these disadvantages and to provide a rotary machine able to be used just as well as an internal combustion engine, as a turbine, as a compressor, as a pump and the like, of very simple, very strong construction and comprising a limited number of moving components, this machine offering the advantage of being fitted with sealing means affording it a high efficiency.

For that purpose, according to the invention, the rotor is provided with at least one cylindrical chamber, the axis thereof is at right angles to the axis of the rotor, a piston being fitted in this chamber and mounted on the crank pin of a crank-shaft carried by the stator, the crank pin and the crank-shaft being offset with reference to the axis of rotation of the rotor, so as to impel the piston with a reciprocating motion inside the chamber, during the rotation of the rotor, in order that the space comprised between the wall of the chamber, the working face of the piston and the inner wall of the stator shall be alternately a maximum and a minimum, the rotor being recessed in order to permit the passage and the rotation of the crank-shaft.

According to a form of embodiment of the invention, the said chamber passes right through the rotor.

According to an advantageous form of embodiment of the invention, the distance between the main crank-shaft axis and the rotor axis is substantially equal to the distance between the main crank-shaft axis and the axis of the said crank pin.

According to a particularly advantageous form of embodiment of the invention, the piston is mounted directly on the said crank pin, the latter being fitted inside a recess provided in the piston at an equal distance from the ends thereof, the axis of the recess being at right angles to the axis of the piston.

Other details and features of the invention shall become apparent from the description of the drawings accompanying the present specification and which represent, by way of non limiting examples, particular forms of embodiment of rotary engines according to the invention.

FIG. 1 is an elevational sectional view of an internal combustion engine according to the invention.

FIGS. 2 through 6 are elevational sectional views corresponding to FIG. 1 and showing the components of the motor in different positions.

FIG. 7 is a sectional view on a larger scale and along line VII—VII of FIG. 1.

FIG. 8 is an elevational sectional view along line VIII—VIII of FIG. 9, of a turbine according to the invention.

FIG. 9 is a sectional view along line IX—IX of FIG. 8.

FIGS. 11 and 12 show alternatives of the rotary machine illustrated in FIG. 10.

FIGS. 13 to 17 show sets made up from rotary engines according to the invention, these sets being established either by means of engines exercising the same function, or by means of engines exercising different functions.

In the different figures, the same reference numerals refer to similar components.

Figure 10:
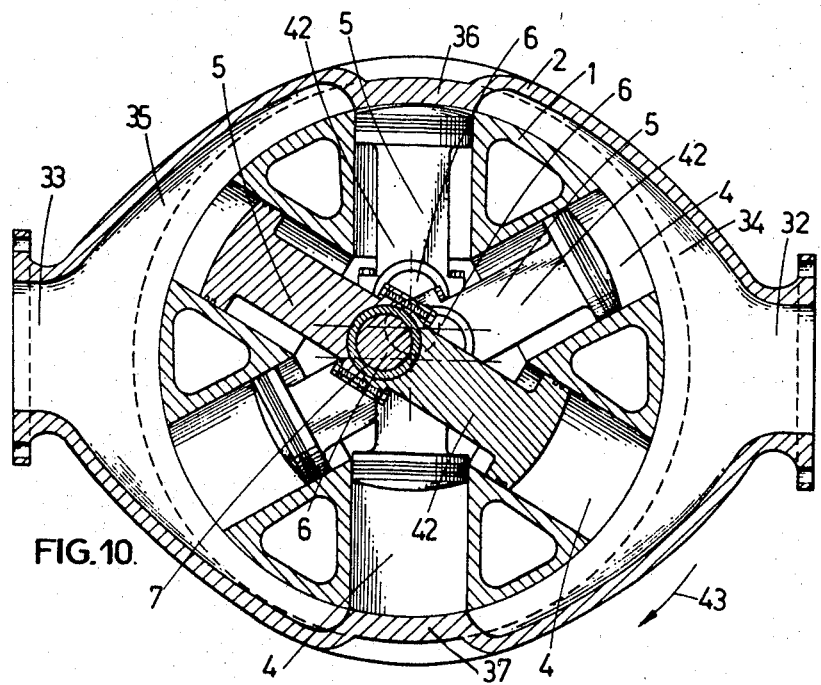
FIG. 10 is an elevational sectional view of an alternative of the turbine shown in FIGS. 8 and 9.

The internal combustion engine according to the invention shown in FIGS. 1 through 7 comprises a rotor 1 rotating inside a stator 2 and coaxially therewith. The stator 2 comprises a cylindrical casing open at one of the ends thereof in order to permit the assembly of the rotor, such end being sealed by a disc 3. Rotor 1 presents a cylindrical chamber 4, the axis whereof is at right angles to the rotor axis, a piston 5 being fitted inside such chamber 3 and mounted on the crank pin 6 of a crank-shaft 7 carried by the stator 2 and the disc 3. The rotor 1 is recessed so as to permit the passage and the rotation of the crank-shaft 7, such recessing dividing the said chamber 4 in two cylindrical chambers 8 and 9, the chamber 8 being the combustion chamber, while chamber 9 is a precompression chamber. The rotor is carried out in two parts 10 and 11 coupled together to provide the said chambers and comprises two conduits 12 connecting the chambers 8 and 9 together. The piston, produced as a single piece and provided with packing rings 23 is mounted directly on the crank pin 6, the latter being fitted inside a recess provided in the piston at equal distance from the ends thereof, the axis of the recess being at right angles to the axis of the piston 5, the latter being of such a length that, when the head 13 thereof is at upper dead center in the combustion chamber 8, the bottom 14 of the piston is always located in the precompression chamber 9. The crank-shaft 7 and the crank pin are offset with reference to the axis of rotation 15 of the rotor, the distance between the main axis of crank-shaft 7 and the rotor axis 15 being equal to the distance between the main axis 18 of the crank-shaft and the axis of the crank pin 6, this distance being equal to one quarter of the stroke of piston 5. A pinion 16 is keyed on the crank-shaft 7 and cooperates with a geared rim 17 on the rotor 1, so as to provide a hypocycloidal gearing, the pitch circle radius of the pinion 16 being substantially equal to one half of the pitch circle radius of the geared rim, the pitch circle radius of the pinion being substantially equal to the distance between the axis of the crank pin 6 and the main axis 18 of the crank-shaft 7. The stator 2 is provided, on the one hand, with two admission ports 19 and one exhaust port 20 to which lead corresponding connecting branches, not shown, and, on the other hand, with a fuel nozzle 21 as well as with ignition means 22.

The piston 5 is impelled with a reciprocating motion inside the chambers 8 and 9 in order that the space comprised between the wall of the chambers, the working face of the piston and the inner wall of the stator shall be alternately a maximum and a minimum. The center of gravity of the piston describes a rotating movement around the main axis 18 of the crank-shaft 7 and the piston a rotating movement around its center of gravity, the latter movement resulting from the rotation of the rotor around its axis 15, the rotation of the rotor taking place, on account of the said hypocycloidal gearing, at an angular velocity equal to one half the angular velocity of the center of gravity of the piston around the main axis of the crank-shaft. If the center of gravity of the piston is impelled solely with a movement of rotation, a point of the ends of the latter shall describe a curve resulting from the two said movements of rotation, this curve being the conchoid of a circle, the displacement of the axis of the crank pin being equal to the pitch circle diameter of the gear rim 17 and to the stroke of the piston.

The working of the said motor is as follows: explosion has just taken place (FIG. 1), the head 13 of the piston reaches upper dead center in the combustion chamber 8. At the same instant, the bottom 14 of the piston ceases to draw in air into the precompression chamber 9. The expansion of the products of combustion takes place and forces the head of the piston towards its lower dead center, which results, on account of the crank-shaft and the hypocycloidal gearing, in a rotation of the rotor in the direction of the arrow 24 (FIG. 2). The rotor (FIG. 3), uncovers the exhaust port 20 and the products of combustion are expelled. The head of the piston uncovers the scavenging ports 25, which connect, by means of the conduits 12, the chambers 8 and 9 together and the compressed air in the precompression chamber 9 is delivered to the chamber 8 expelling the products of combustion towards the exhaust port. The exhaust continues (FIG. 4) and the head of the piston reaches its lower dead center, the air from the precompression chamber 9 having been completely transferred to the combustion chamber 8. The head 13 of the piston initiates its compression stroke (FIG. 5) which will actually start when the ports 25 shall be sealed by the piston. The air is drawn, through the ports 19, into the precompression chamber. In the combustion chamber, the compression is continued (FIG. 6), chamber 8 passes in front of fuel nozzle 21 and arrives opposite sparking plug 22 which causes the ignition of the air fuel mixture and the explosion takes place, the piston drawing air into the precompression chamber 9. The cycle is repeated after the explosion.

The rotary engine according to the invention and shown in FIGS. 8 and 9 is a turbine comprising a rotor 1 rotating inside a stator 2 and coaxially therewith. The stator 2 comprises a cylindrical casing open at both ends thereof, the latter being sealed, after assembly of the rotor, by means of discs 3. Rotor 1 presents two cylindrical chambers 4 and 4' having their axis at right angles to the rotor axis, the latter being recessed so as to permit the passage and the rotation of a crank-shaft 7, such recessing dividing each of the chambers 4 and 4' in two cylindrical chambers 26 and 27 and 26' and 27'. In the chambers 4 and 4', offset by 180°, are provided pistons 5 and 5' mounted, by means of components 28, on crank pins 6 and 6' of the crank-shaft 7, these being also offset by 180° and their axis being at right angles to the axis of the pistons. Crank-shaft 7 is mounted in the discs 3 by means of ball bearings 29 and is offset with reference to the axis 15 of the rotor rotatably mounted by means of ball bearings 30 on the said discs 3. The crank pins 6 and 6' are likewise offset with reference to the crank-shaft main axis 18, the distance between the rotor axis and the crank-shaft main axis 18 being equal to the distance between the latter and the axis of the crank pins. The center portion 31 of the pistons 5 and 5', produced as a single piece, is advantageously recessed so that the distance between the axis of the pistons shall be less than the diameter of the chambers 4 and 4'. The stator 2 is provided with an admission port 32 and an exhaust port 33 diametrically opposite one another, the axis whereof is positioned at equal distance from the axes of the chambers 26 and 27 and 26' and 27'. Each of these ports 32 and 33 communicates with a corresponding port 34 or 35 provided in the stator and extending regularly on either side of the port, the distance between the adjacent ends of these two ports being at least equal to the diameter of the chambers 4 and 4'. The portions of material 36 and 37 positioned between the said ports assure the sealing between admission and exhaust, packing rings 38 being provided on the pistons as well as between the rotor 1 and the discs 3 to assure the sealing of the engine and thereby to ensure a high efficiency thereof.

The working of the turbine is as follows: the pressurized fluid is admitted through port 32, to port 34 and spreads within the latter. As the chambers 4 and 4' are offset by 180°, at least one of the chambers 26, 26', 27 and 27' will be positioned, on running in the turbine, within the zone covered by the admission port 34. Assuming that, on running in, as shown in FIG. 8, the axis of piston 5' is positioned in a horizontal plane passing through the axis of the ports 32 and 33 and that the second piston 5 faces the bosses 36 and 37 of the stator. The piston 5' will then be at half stroke, the rotor having covered a quarter revolution as from the upper dead center of such piston. The pressure applied to the head 39 of the piston 5' results in rotating crank-shaft 7 in the direction of the arrow 41, and the piston 5, also impelled by the crank-shaft, departs from its dead center position, so that chamber 26 communicates with the inlet port 34, the head 40 of the piston being thus subjected to the pressure of the fluid admitted to the port 34, the heads 39 and 40 of the pistons 5 and 5' being thus subjected to the fluid pressure. By virtue of this pressure, the crank-shaft rotates under the thrust of the two pistons and the head 39 of the piston, on reaching its lower dead center, will face boss 37, chamber 26' containing pressurized fluid, and the head 40 of the piston 5 will have its axis positioned in the said horizontal plane and be at half stroke. After passing the boss 37, the fluid contained in the chamber 26' escapes, by virtue of the action of head 39 of the piston 5', through the exhaust port 35 and chamber 27' is brought into communication with admission port 34, the cycle terminating when piston 5 faces again the bosses 36 and 37.

The rotary engine shown in FIGS. 8 and 9 may, of course, be used, after adjustment of the bosses 36 and 37, as a compressor or as a pump, in which case the crank-shaft 7 is motor driven.

The rotary engine according to the invention and shown in FIG. 10 is an alternative embodiment of the turbine shown in FIGS. 8 and 9, it comprises a rotor 1 rotating inside a coaxial stator 2, admission and exhaust ports 32 and 33 diametrically opposite one another being provided in the stator as well as inlet and exhaust ports 34 and 35 extending regularly on either side of the ports 32 and 33 and determining bosses 36 and 37 corresponding at least to the diameter of chambers 4 provided inside the rotor. There are three such chambers 4 which are offset 120° one with reference to the other, double acting pistons 5 being mounted inside these chambers on crank pins 6 of crank-shaft 7, these being in turn offset 120° one with reference to the other and their axis being at right angles to the axis of the pistons produced in two pieces, the rotor being recessed so as to permit the passage and the motion of crank-shaft 7 which is carried by the stator. The crankshaft is offset with reference to the rotor axis and the crankpins are offset with reference to the crank-shaft main axis, the distance between the rotor axis and the crank-shaft main axis being equal to the distance between the latter and the axis of each crank pin. The center portion 42 of the pistons is fitted and mounted on the crank shaft crank pins so that the piston heads shall be positioned in the same plane at right angles to the rotor axis. The turbine comprises in fact six chambers offset 60° between one another, at least two of such chambers being at all times, whatever may be the position of rotor 1, in communication with the admission port 34. The complete turbine cycle is carried out for one revolution of the rotor moving in the direction of the arrow 43, during such rotation of the rotor the pistons carrying out a forward and return stroke and the crank-shaft two revolutions.

As shown in FIG. 10, the sealing bosses correspond substantially to the diameter of the chambers 4 and must open or close the admission and the exhaust at the moment when the pistons pass through the upper dead center and the lower dead center, facing the bosses. In practice, with such bosses, the effciency of the turbine or motor will not be a maximum. In order to improve the working and the efficiency of the engine, boss shifting is carried out, which has for its object to determine the angular leads or angular lags with reference to the opening and closing of admission and exhaust.

Figure 11:
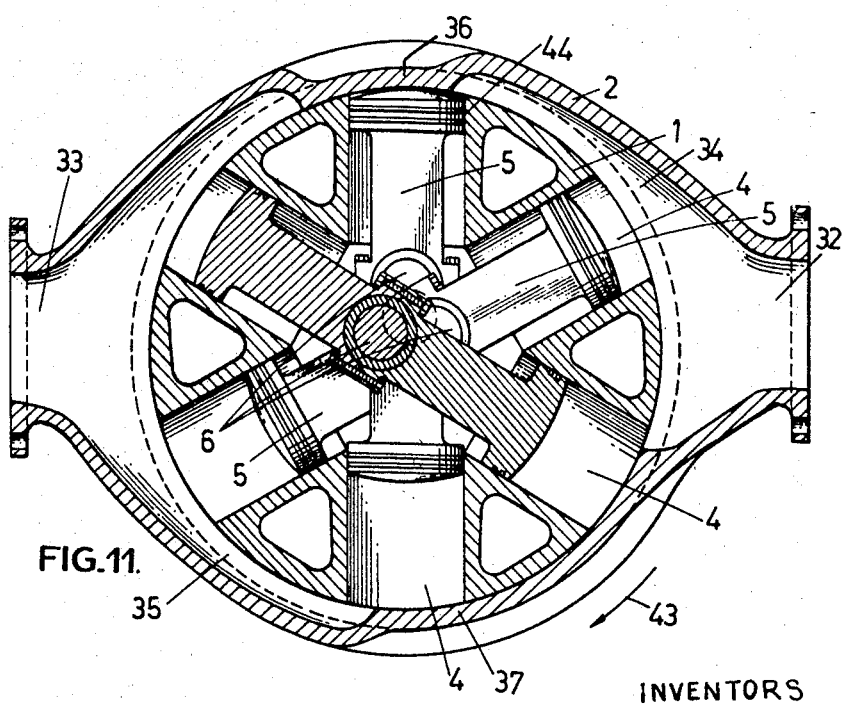

When setting out the bosses as shown in FIG. 11, it will be noted that the boss 36, which is used to close the exhaust and to open the admission, opens the admissions ahead of the upper dead center (lead to the opening of the admission). In this manner, the pressure of the fluid will be immediately applied to the head of piston 44 as soon as it will initiate its relative downwards motion. The same is carried out for the boss 37 which is used to close the admission and to open the exhaust. As shown, in FIG. 11, boss 37 closes the admission about 70° ahead of the lower dead center of the pistons (lead to the closure of the admission). The crank pin of the piston located within this zone of 70° is in the zone disfavouring a satisfactory efficiency of mechanical transmission and in the corresponding chamber, already closed, the pressurized fluid, admitted at admission pressure prior to the closing of the chamber, will continue to expand for about a quarter of its stroke, as far as the lower dead center. In view of the fact that at the end of the expansion stroke, there is still an important pressure in the chamber, if the latter is brought intto communication with the exhaust when the corresponding piston is at lower dead center, the piston which intimates its relative upwards motion has to overcome the fluid counter-pressure. On the contrary, if, as shown in FIG. 11, the communication of this chamber with the exhaust 35 is established a little ahead of the lower dead center, the pressure of the fluid will have already dropped and the return of the piston will be carried out without counter-pressure (lead to the opening of the exhaust), the boss 36 being moreover fitted so as to allow a slight lead to the closure of the exhaust.

The rotary machine shown in FIG. 12 is meant to be used as a compressor. The admission port 32 and the exhaust port 33 are in that case offset, the exhaust port being displaced in order to be positioned close to the upper dead center of the pistons. In addition the boss 37 is extended as far as the exhaust port, in order that the fluid may be pressurized and released only at right angles to such port, boss 36 corresponding substantially to the diameter of the chambers.

The FIGS. 13 through 17 show by way of examples, some sets made up by means of rotary engines according to the invention.

FIG. 13 shows a two-stage compressor, while FIGS. 14 and 15 show, on the one hand, two turbines fed in parallel, the crank-shafts thereof are in alignment and made integral and, on the other hand, a two-stage turbine. FIG. 16 shows a compressor 45 pressurizing air delivered to a combustion chamber 46 supplying gas to the turbine 47, the compressor and the turbine having a common crank-shaft. FIG. 17 shows a compressor 48 combined with a motor 49, the compressor delivering compressed air to the motor, compressor and motor having a common crank-shaft.

It will be understood that the invention is in no way limited to the forms of embodiment described and that many changes may be made to the latter without departing from the scope of the present patent application.

In particular, two rotors could be provided, each one with at least one chamber, mounted inside the same stator, the chambers of the rotors being offset one with reference to the other, the stator having as many admission and exhaust ports as there are rotors, the crank-shaft being common to the rotors and provided with as many crank pins as there are pistons, the crank pins being offset in the same manner as the chambers, a wall being provided to isolate the rotors, this wall acting at the same time as a bearing for the crank-shaft.

I claim:

1. A rotary machine, comprising a stator, a cylindrical space within the said stator and an internal cylindrical surface surrounding said space, a cylindrical rotor rotatably received in said space and having a plurality of coplanar diametral through bores defining a plurality of cylindrical chambers whose axes are perpendicular to the axis of said space, piston means reciprocably received in each cylindrical chamber and having two end faces, a crank shaft rotatably received in the said stator, the axis of said crank shaft being eccentric with reference to the axis of said space, a plurality of crank pins carried by said crank shaft, each piston means having a central cylindrical body whose axis is parallel with the axis of said space, each crank pin being received in one of the said bodies, the said cylindrical surface having a section which is nearest to the one and thereupon to the other end face of each piston means during each revolution of said rotor, said rotor having a pair of ports communicating with said space, each of said ports communicating with one and thereupon with the other axial end of each chamber during each revolution of said rotor.

2. A rotary machine as in claim 1 wherein the angular spacing between the axes of the chambers nearest to one another is equal to 360°/$n$, wherein $n$ is the number of chambers.

3. A rotary machine according to claim 1, in which each piston means comprises two parts, each part comprising a piston head and an arm which carries at one of its ends said piston heads, and connecting means to mount the other end of the said arm on a crank pin common to the two parts.

4. A rotary machine as claimed in claim 1, wherein, when operating as a turbine, a compressor, a pump, and the like, the stator is provided with an admission port and an exhaust port.

5. A rotary machine as claimed in claim 4, wherein the admission and exhaust ports are diametrically opposite one another, each of these ports communicating with a port provided in the stator and extending regularly on either side of the port, the distance between the adjacent ends of the two ports being at least equal to the diameter of the chamber.

6. A rotary machine as claimed in claim 5, wherein the admission and exhaust ports are not in alignment, each of these ports opening into a port, the extent of the ports being unequal, as well as the distances separating the adjacent ends of the ports, the smaller of these distances being at least equal to the diameter of the chamber.

References Cited
UNITED STATES PATENTS

| | | | |
|---|---|---|---|
| 753,390 | 3/1904 | Hamann | 103—161 |
| 1,028,316 | 6/1912 | Allyn | 123—44 |
| 1,495,611 | 5/1924 | Parrouffe | 91—202 |
| 3,200,797 | 8/1965 | Dillenberg. | |
| 3,289,655 | 12/1966 | Franke. | |

FOREIGN PATENTS

| | | |
|---|---|---|
| 28,411 | 1913 | Great Britain. |
| 154,740 | 4/1883 | France. |
| 483,620 | 5/1917 | France. |
| 517,676 | 12/1920 | France. |
| 640,936 | 1/1937 | Germany. |

WENDELL E. BURNS, Primary Examiner

U.S. Cl. X.R.

92—58; 123—44